(12) United States Patent
Surprise et al.

(10) Patent No.: US 9,824,413 B2
(45) Date of Patent: Nov. 21, 2017

(54) SORT-FREE THREADING MODEL FOR A MULTI-THREADED GRAPHICS PIPELINE

(71) Applicant: Intel Corporation, Santa Clara, CA (US)

(72) Inventors: Jason M. Surprise, Beaverton, OR (US); Zack S. Waters, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 156 days.

(21) Appl. No.: 14/542,571

(22) Filed: Nov. 15, 2014

(65) Prior Publication Data

US 2016/0140684 A1    May 19, 2016

(51) Int. Cl.
G06T 1/20 (2006.01)
G09G 5/36 (2006.01)
G06T 15/00 (2011.01)

(52) U.S. Cl.
CPC .............. *G06T 1/20* (2013.01); *G06T 15/005* (2013.01); *G09G 5/363* (2013.01)

(58) Field of Classification Search
CPC ......... G06T 1/20; G06T 15/00; G06T 15/005; G06T 5/36; G06T 5/363
See application file for complete search history.

(56) References Cited

U.S. PATENT DOCUMENTS

| | | | | |
|---|---|---|---|---|
| 6,795,845 B2 * | 9/2004 | Kalafatis | ............... | G06F 9/3802 712/219 |
| 7,975,272 B2 * | 7/2011 | Jiang | ........................ | G06F 9/546 712/216 |
| 2003/0214660 A1 * | 11/2003 | Plass | ...................... | G06K 15/00 358/1.9 |
| 2005/0071526 A1 * | 3/2005 | Brokenshire | ........... | G06F 9/544 710/52 |
| 2008/0165199 A1 * | 7/2008 | Wei | ........................ | G06T 15/005 345/506 |
| 2010/0115196 A1 * | 5/2010 | Hamilton | ............ | G06F 13/4027 711/108 |

(Continued)

FOREIGN PATENT DOCUMENTS

| | | |
|---|---|---|
| CN | 107148619 A | 9/2017 |
| EP | 3218869 | 9/2017 |
| WO | 2016/077036 A1 | 5/2016 |

OTHER PUBLICATIONS

International Search Report and Written Opinion received for International Application PCT/US2015/056267, dated Feb. 1, 2016, 14 pages.

(Continued)

*Primary Examiner* — Maurice L McDowell, Jr.
*Assistant Examiner* — Donna J Ricks
(74) *Attorney, Agent, or Firm* — Alpine Technology Law Group LLC (57) ABSTRACT

Methods and apparatus relating to sort-free threading model for a multi-threaded graphics pipeline are described. In an embodiment, draw requests, corresponding to one or more primitives in an image, are stored in entries of a queue (e.g., in the order received). Each entry remains locked until both a front-end and a back-end of a graphics pipeline have completed one or more operations associated with the draw request. Other embodiments are also disclosed and claimed.

26 Claims, 7 Drawing Sheets

(56) References Cited

U.S. PATENT DOCUMENTS

2010/0262979 A1* 10/2010 Borchers ................. G06F 9/544
719/321
2014/0354644 A1* 12/2014 Nystad ...................... G06T 1/20
345/426

OTHER PUBLICATIONS

Communication received for European Patent Application No. 15859719.5, dated Jun. 22, 2017, 2 pages.
International Preliminary Report on Patentability received for International Application No. PCT/US2015/056267, dated May 26, 2017, 9 pages.

* cited by examiner

SORT-FREE THREADING MODEL FOR A MULTI-THREADED GRAPHICS PIPELINE

FIELD

The present disclosure generally relates to the field of electronics. More particularly, an embodiment relates to sort-free threading model for a multi-threaded graphics pipeline.

BACKGROUND

Current software rasterizers are either single threaded or only thread parts of the graphics pipeline, reducing the effectiveness of rendering large vertex count workloads, like HPC (High Performance Computing) workloads which can render many millions of triangles.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Some embodiments provide a sort-free threading model for a multi-threaded (e.g., software) graphics pipeline. An embodiment provides a high performance multi-threaded (e.g., tile based) software rendering (or processing) for the graphics pipelines. Moreover, an architecture is provided that allows for full multi-threaded support across the entire graphics pipeline, e.g., providing a software rasterization solution that rivals the performance of discrete GPUs (Graphic Processing Units) for certain workloads. Further, the sort-free algorithm for threading may allow for the vertex pipeline to be fully multi-threaded, e.g., avoiding costly synchronization and/or triangle reordering between the vertex and pixel pipelines, as seen in other solutions.

Figure 1:
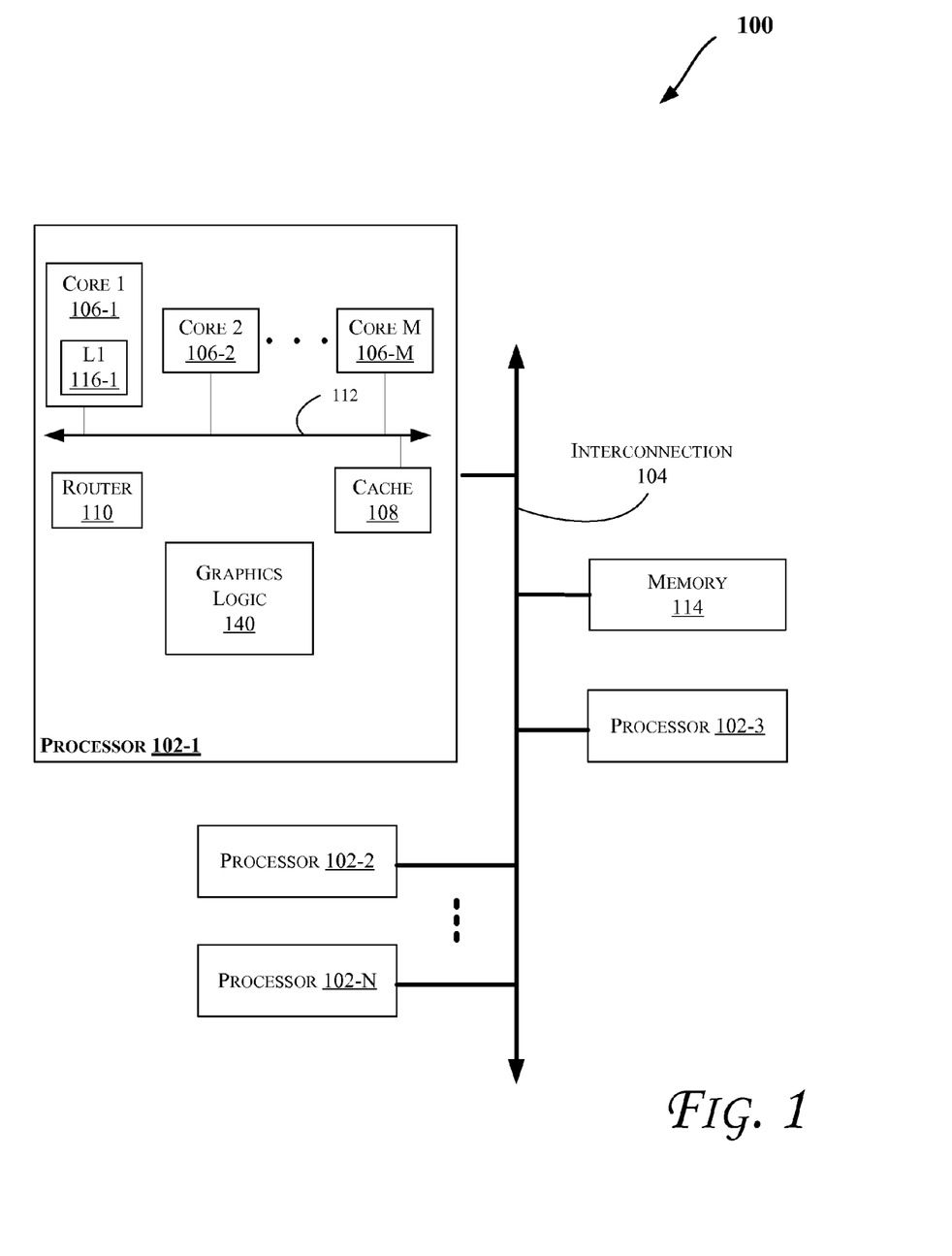
FIGS. 1 and 5-7 illustrate block diagrams of embodiments of computing systems, which may be utilized to implement various embodiments discussed herein.

While some embodiments are generally discussed with reference to graphics logic (such as a graphics pipeline), embodiments are not limited only to graphics related logic and may be also applied to other types of non-graphic (e.g., general-purpose) logic capable of performing the operations discussed herein. Further, some embodiments may be applied in computing systems that include one or more processors (e.g., with one or more processor cores), such as those discussed with reference to FIGS. 1-7, including for example mobile computing devices, e.g., a smartphone, tablet, UMPC (Ultra-Mobile Personal Computer), laptop computer, Ultrabook™ computing device, smart watch, smart glasses, etc. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may be general-purpose CPUs and/or GPUs in various embodiments. The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 5-7), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

As shown in FIG. 1, the processor 102 may further include graphics logic 140 (e.g., which may include a graphics pipeline such as those discussed with reference to FIGS. 2-7) to perform various graphics and/or general purpose computation(s) related operations such as discussed herein. Logic 140 may have access to one or more storage devices discussed herein (such as cache 108, L1 cache 116, memory 114, register(s), or another memory in system 100) to store information relating to operations of the logic 140, such as information communicated with various components of system 100 as discussed herein. Also, while logic 140 is shown inside the processor 102, it may be located elsewhere in the system 100 in various embodiments. For example, logic 140 may replace one of the cores 106, may be coupled directly to interconnection 112 and/or interconnection 104, etc.

As mentioned above, some embodiments provide an architecture to allow for full multi-threaded support across the entire graphics pipeline, e.g., providing a software rasterization solution that rivals the performance of discrete GPUs (Graphic Processing Units) for certain workloads. Further, a sort-free algorithm may be used for threading, which allows for the vertex pipeline to be fully multi-threaded and avoids costly synchronization and triangle reordering between the vertex and pixel pipelines, as seen in other solutions. By contrast, current software rasterizers are unable to solve the triangle ordering problem, and so they are forced to process triangles in order, usually from a single thread, severely reducing performance for certain workloads (e.g., primarily vertex-bound workloads as found in HPC visualization).

Figure 2:
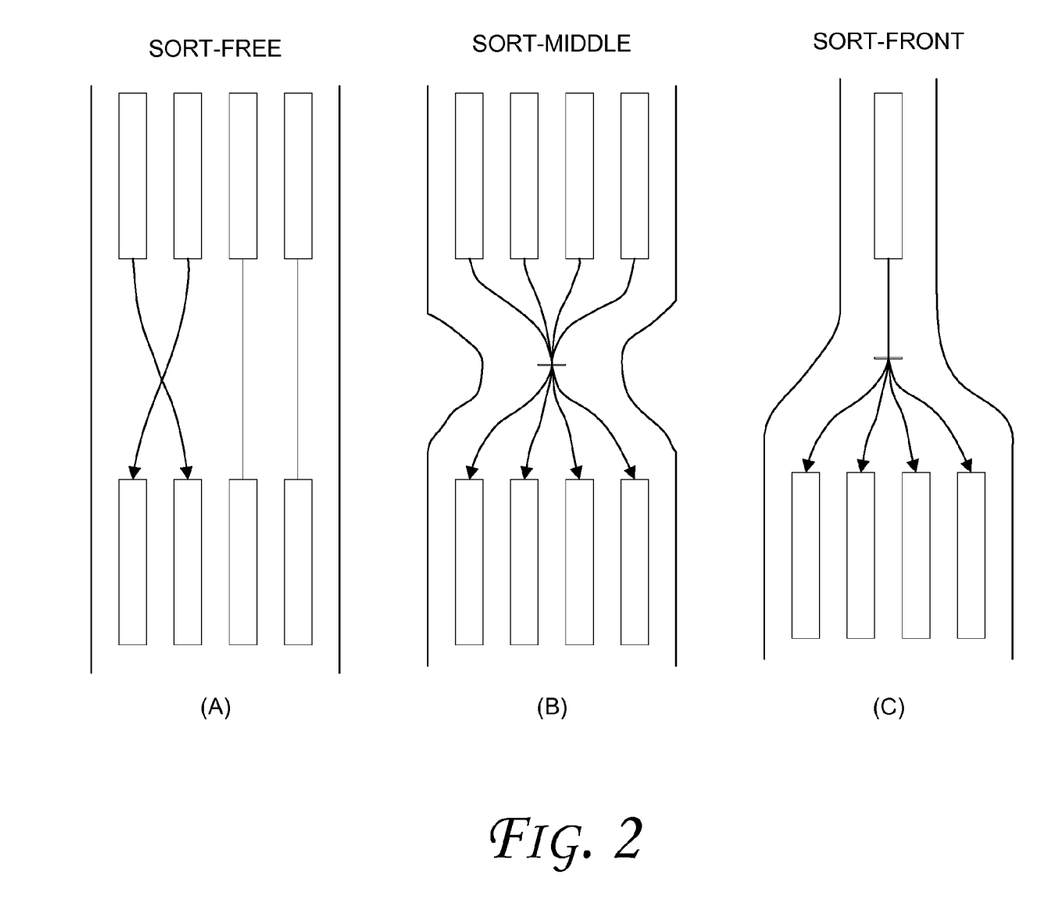
FIG. 2 illustrates a comparison diagram for sample sorting operations, according to some embodiments.

Moreover, FIG. 2 illustrates a comparison diagram for sort-free, sort-middle, and sort-front sample operations in graphics pipelines, according to some embodiments. Generally, to achieve better performance from software rendering, multi-threading is used, where each thread executes operations associated with one or more portions of an image. These image portions are generally referred to herein as geometric primitives (or more generally primitives) which are geometric objects that are handled, store, stored, etc. This division of labor allows for parallel processing. A graphics pipeline (e.g., shown vertically in FIG. 2 for each type of sort-free, sort-middle, and sort-front operations) can be conceptualized as having two main parts, a front-end (e.g., performing geometric processing) and a back-end (e.g., performing rasterization processing).

One of the fundamental properties of a graphics pipeline is that primitives are rendered in the order specified by the user. Because of this, the threading models employed by the state of the art generally fall into two categories, sort-front (C) and sort-middle (B). In a sort-front model (C), primitives are sorted or distributed early in the graphics pipeline. In a sort-middle model (B), the primitives are sorted/distributed in the middle of the graphics pipeline. Each of these approaches introduce costly bottlenecks that limit the performance potential. To this end, an embodiment (which may be referred to as "sort-free") addresses these limitations by removing sorting bottlenecks. This allows threads to freely run both front-end and back-end work, while still maintaining the primitive order specified by the user.

Figure 3:
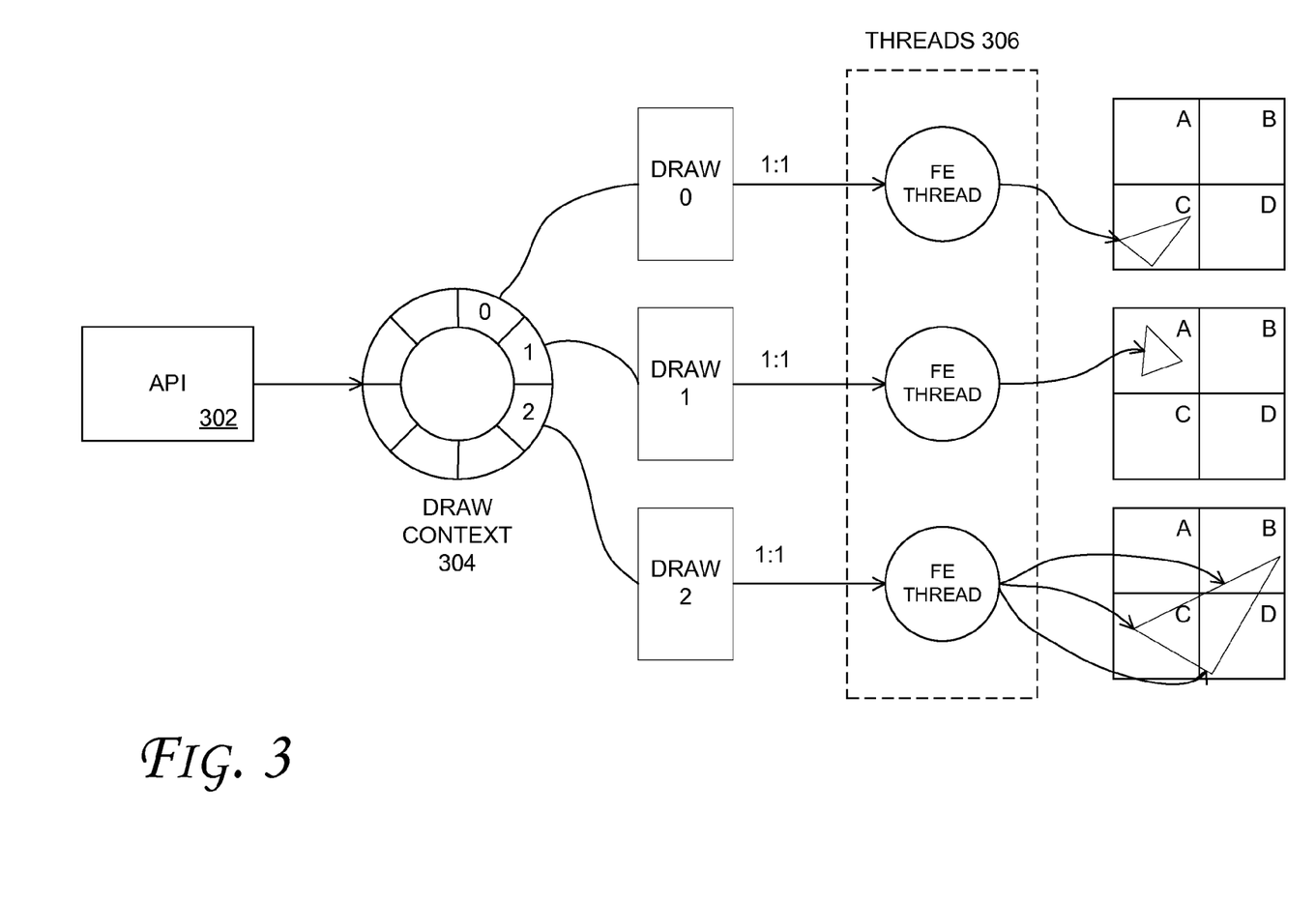
FIGS. 3-4 illustrate block diagrams of graphics pipelines, according to some embodiments.
Figure 4:
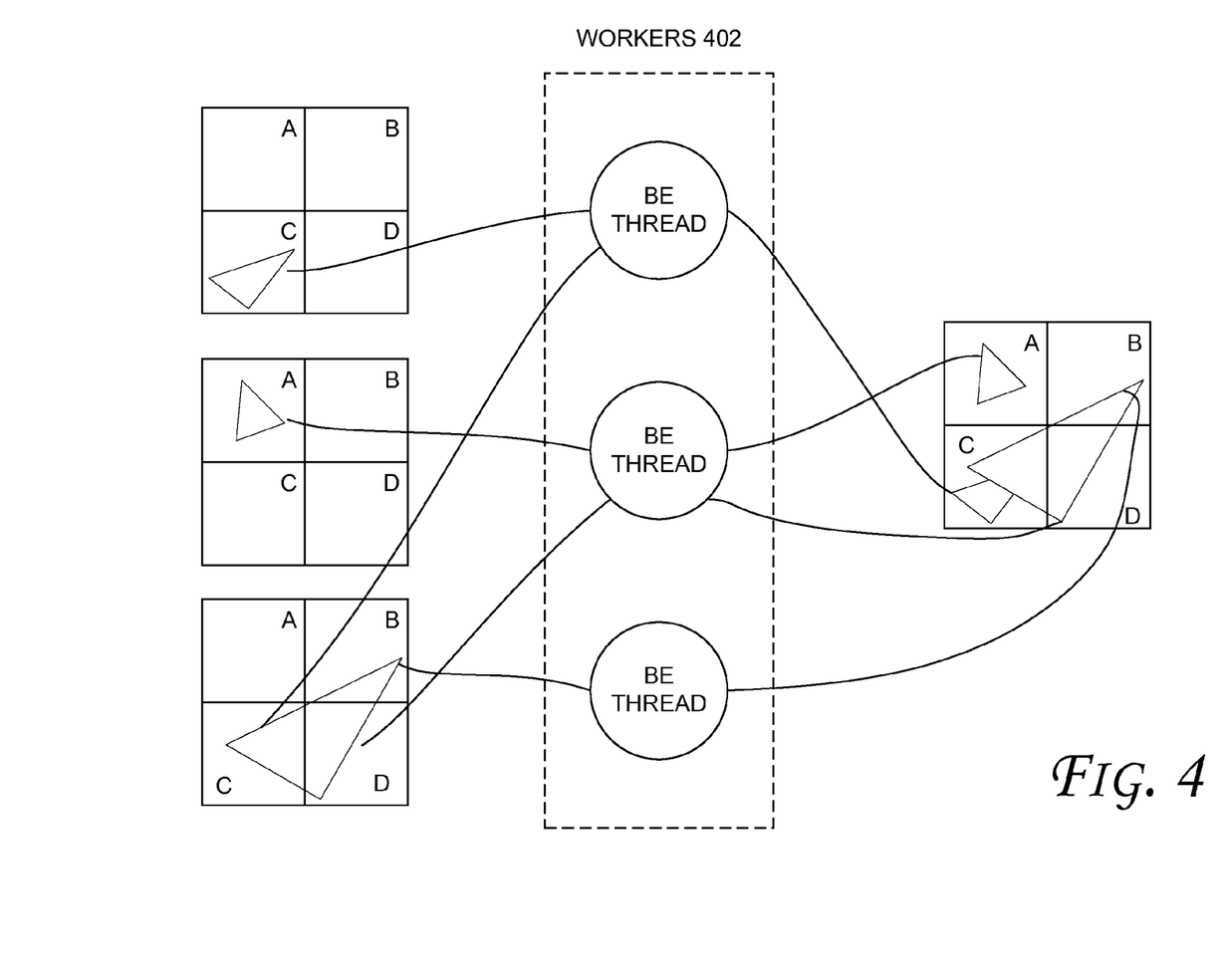

FIGS. 3-4 illustrate block diagrams of graphics pipelines, according to some embodiments. More particularly, FIG. 3 illustrates how the front-end is threaded. As draw requests are received from the user (e.g., via a software application or interface, such as an Application Program Interface (API) 302), they are placed into a circular queue 304 (called the DRAW_CONTEXT queue). There is one draw per entry in the queue, and they are ordered exactly as they are received from the user (e.g., 0, 1, 2, etc.). Once an entry is placed into the DRAW_CONTEXT queue 304, a thread (e.g., FE (Front-End) thread(s) 306) is free to claim a valid DRAW_CONTEXT entry (e.g., illustrated as Draws 0, 1, and 2 in FIG. 3). Through locking, one may enforce a single thread to execute the front-end work for any DRAW_CONTEXT (illustrated as 1:1 in FIG. 3). The queue 304 may be sized to enable enough draws in flight to ensure the threads have enough work to perform (i.e., provide more efficient/continuous use of the threads by ensuring that the threads are kept busy processing draw requests during a time period). The corresponding queue entry stays locked until both the front-end and back-end fully complete the work associated with the draw request stored in the queue entry.

More specifically, each front-end thread 306 renders the primitive and bins/places each primitive into the corresponding tile that it intersects (labeled as tiles A-D in FIG. 3). Once a front-end thread has finished binning all the primitives, the DRAW_CONTEXT entry is marked 'Front-End Complete' which denotes that threads can now pick up this DRAW_CONTEXT to perform back-end rendering, as illustrated in FIG. 4. A Back-End (BE) thread 402 is free to pick up any tile from any valid DRAW_CONTEXT entry as long as all previous DRAW_CONTEXTs for the same tile have been rendered. Tiles within a single DRAW_CONTEXT can be rendered simultaneously by multiple BE threads 402. As discussed herein, a tile generally refers to a portion of an image. For example, each image may be divided into multiple tiles that are arranged in an array or matrix format.

Accordingly, high performance software rasterization on general-purpose (or graphics) logic (such as logic 140) may provide an alternative to costly discrete GPUs. In addition, since GPU/processor functionality is becoming more overlapping, some embodiments discussed herein could be used to influence or assist GPU hardware.

Figure 5:
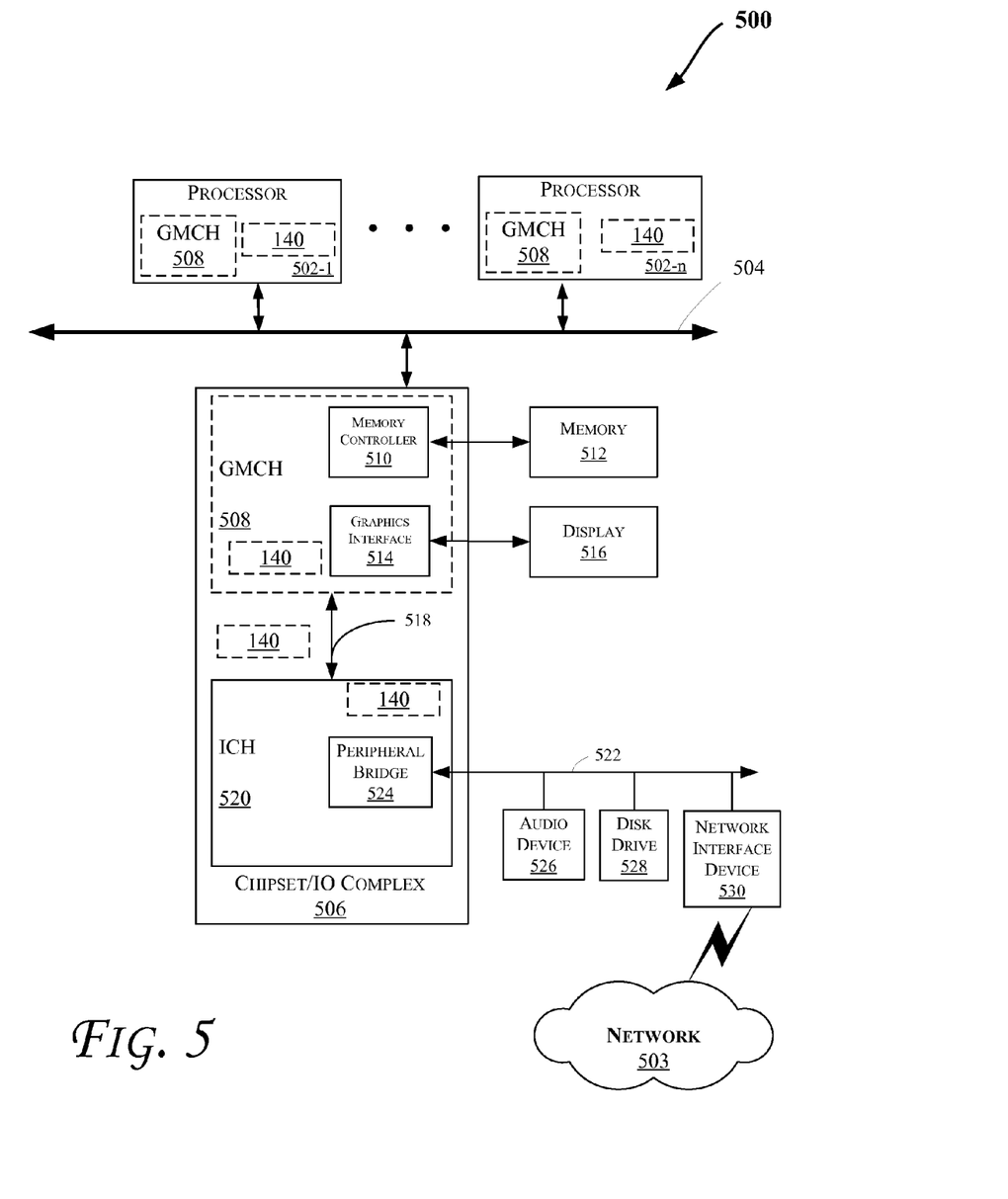

FIG. 5 illustrates a block diagram of a computing system 500 in accordance with an embodiment. The computing system 500 may include one or more central processing unit(s) (CPUs) 502 or processors that communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)).

Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may be the same or similar to the processors 102 of FIG. 1. For example, one or more components of system 500 may include logic 140, discussed with reference to FIGS. 1-4. Also, the operations discussed with reference to FIGS. 1-4 may be performed by one or more components of the system 500.

A chipset 506 may also communicate with the interconnection network 504. The chipset 506 may include a graphics memory control hub (GMCH) 508, which may be located in various components of system 500 (such as those shown in FIG. 5). The GMCH 508 may include a memory controller 510 that communicates with a memory 512 (which may be the same or similar to the memory 114 of FIG. 1). The memory 512 may store data, including sequences of instructions, that may be executed by the CPU 502, or any other device included in the computing system 500. In one embodiment, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The GMCH 508 may also include a graphics interface 514 that communicates with a display device 516. In one embodiment, the graphics interface 514 may communicate with the display device 516 via an accelerated graphics port (AGP) or Peripheral Component Interconnect (PCI) (or PCI express (PCIe) interface). In an embodiment, the display 516 (such as a flat panel display) may communicate with the graphics interface 514 through, for example, a signal converter that translates a digital representation of an image stored in a storage device such as video memory or system memory into display signals that are interpreted and displayed by the display 516. The display signals produced by the display device may pass through various control devices before being interpreted by and subsequently displayed on the display 516.

A hub interface 518 may allow the GMCH 508 and an input/output control hub (ICH) 520 to communicate. The ICH 520 may provide an interface to I/O device(s) that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503). Other devices may communicate via the bus 522. Also, various components (such as the network interface device 530) may communicate with the GMCH 508 in some embodiments. In addition, the processor 502 and the GMCH 508 may be combined to form a single chip. Furthermore, a graphics accelerator may be included within the GMCH 508 in other embodiments.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
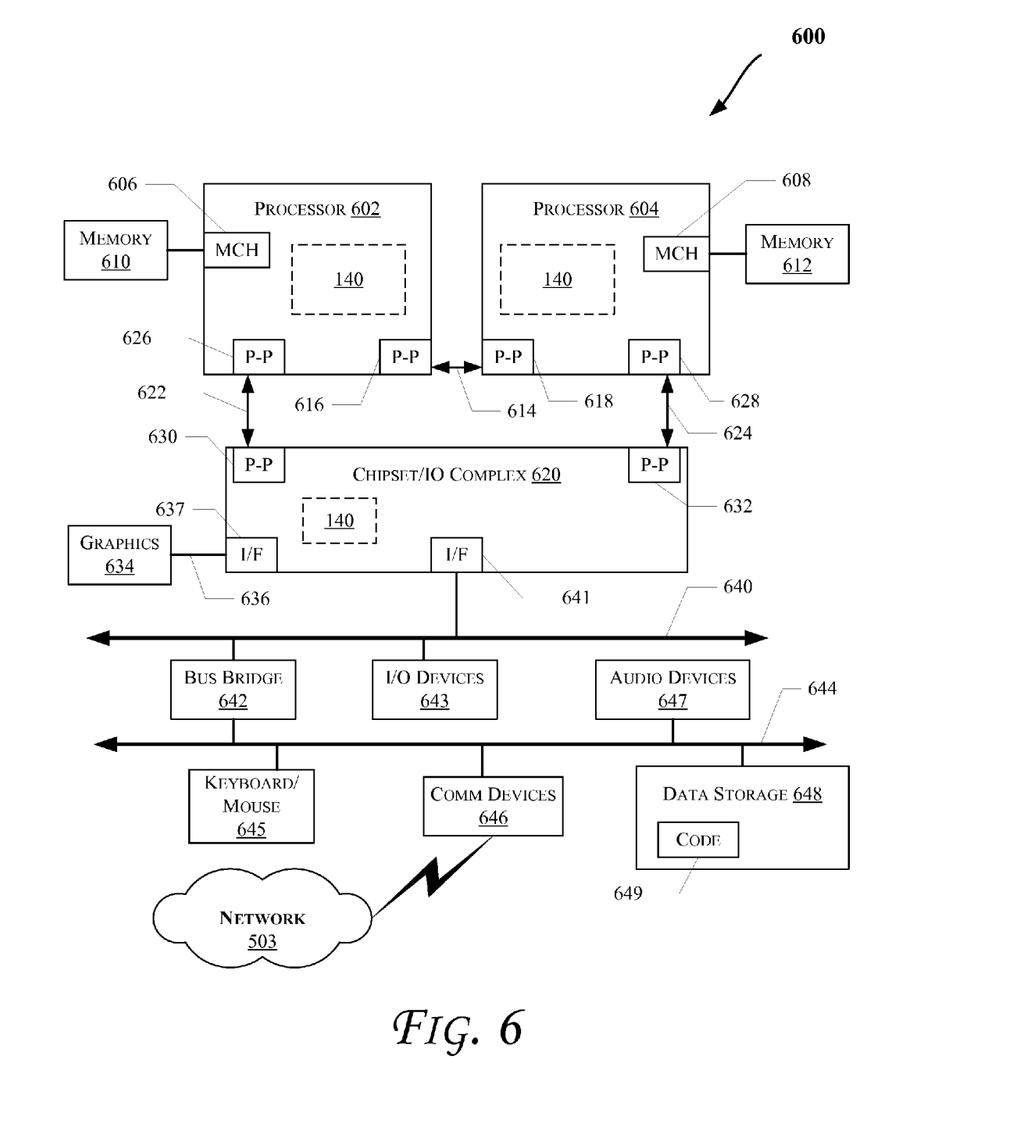

FIG. 6 illustrates a computing system 600 that is arranged in a point-to-point (PtP) configuration, according to an embodiment. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a graphics circuit 634 via a graphics interface 636, e.g., using a PtP interface circuit 637.

At least one embodiment may be provided within the processors 602 and 604. For example, one or more components of system 600 may include logic 140 of FIGS. 1-5, including located within the processors 602 and 604. Other embodiments, however, may exist in other circuits, logic units, or devices within the system 600 of FIG. 6. Furthermore, other embodiments may be distributed throughout several circuits, logic units, or devices illustrated in FIG. 6.

The chipset 620 may communicate with a bus 640 using a PtP interface circuit 641. The bus 640 may communicate with one or more devices, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device 647, and/or a data storage device 648. The data storage device 648 may store code 649 that may be executed by the processors 602 and/or 604.

Moreover, the scenes, images, or frames discussed herein (e.g., which may be processed by the graphics logic in various embodiments) may be captured by an image capture device (such as a digital camera (that may be embedded in another device such as a smart phone, a tablet, a laptop, a stand-alone camera, etc.) or an analog device whose captured images are subsequently converted to digital form). Also, the scenes, images, or frames discussed herein may be generated by art design, game design, or any kind of 3D/2D (two dimensional/three dimensional) industry design. For example, a scene may refer to a set of geometry structure and related texture maps, lighting effects, etc. Moreover, the image capture device may be capable of capturing multiple frames in an embodiment. Further, one or more of the frames in the scene are designed/generated on a computer in some embodiments. Also, one or more of the frames of the scene may be presented via a display (such as the display discussed with reference to FIGS. 5 and/or 6, including for example a flat panel display device, etc.).

Figure 7:
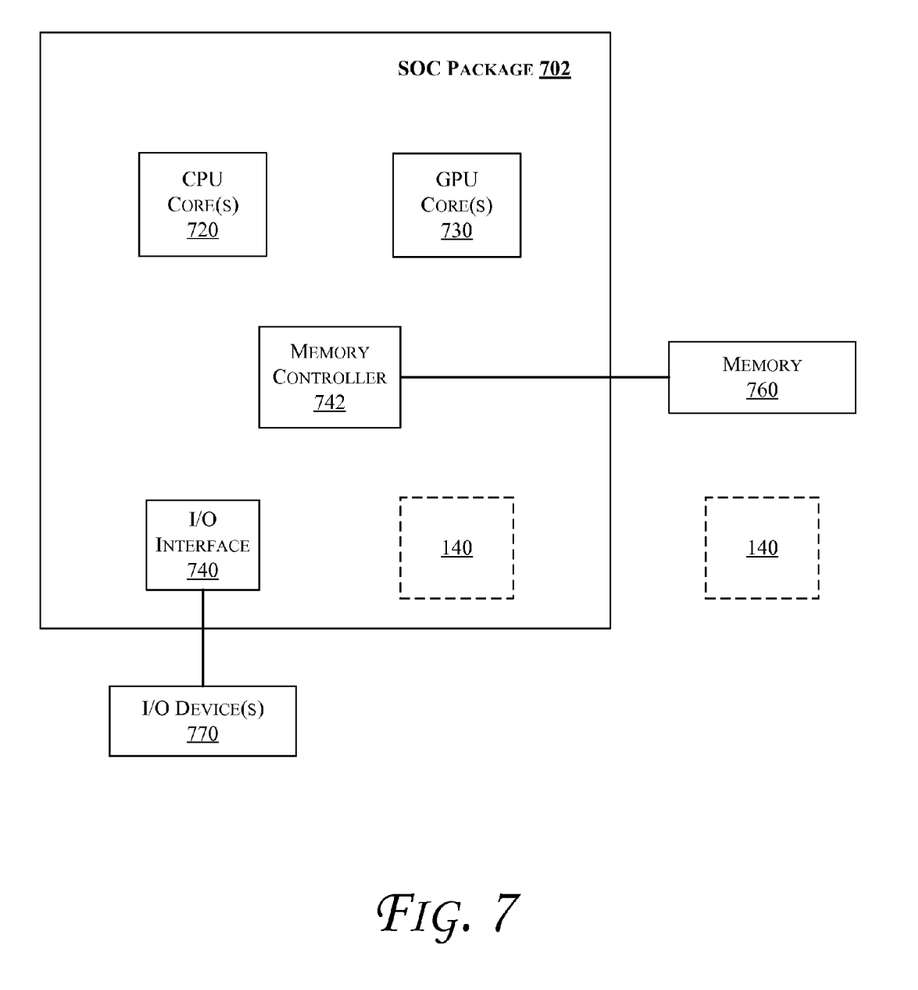

In some embodiments, one or more of the components discussed herein can be embodied as a System On Chip (SOC) device. FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 (which may be similar to or the same as memory discussed herein with reference to the other figures) via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like. Furthermore, SOC package 702 may include/integrate the logic 140 in an embodiment. Alternatively, the logic 140 may be provided outside of the SOC package 702 (i.e., as a discrete logic).

The following examples pertain to further embodiments. Example 1 includes an apparatus comprising: logic, the logic at least partially comprising hardware logic, to cause storage of a draw request, corresponding to one or more primitives in an image, in an entry of a queue, wherein the entry is to be unlocked after both a front-end and a back-end of the logic have completed one or more operations associated with the draw request. Example 2 includes the apparatus of example 1, wherein one or more threads executing on a processor are to perform the one or more operations corresponding to the draw request. Example 3 includes the apparatus of example 1, wherein a front-end thread is to process the one or more primitives and bin each of the processed primitives into a corresponding tile that intersects that processed primitive. Example 4 includes the apparatus of example 1, wherein, once a front-end thread has finished binning all primitives in a tile of the image, a corresponding entry of the queue is to be marked as front-end complete. Example 5 includes the apparatus of example 4, wherein any one of a plurality of back-end threads is capable to be selected to perform back-end processing on the tile. Example 6 includes the apparatus of example 1, wherein tiles within a single draw context are to be processed simultaneously by multiple back-end threads. Example 7 includes the apparatus of example 1, wherein the image is to be divided into multiple tiles that are arranged in an array or matrix format. Example 8 includes the apparatus of example 1, wherein the queue is to be sized to store a sufficient number draw requests to keep a plurality of threads busy processing the draw requests during a time period. Example 9 includes the apparatus of example 1, wherein each entry of the queue is to store a single draw request. Example 10 includes the apparatus of example 1, wherein the queue is a circular queue. Example 11 includes the apparatus of example 1, wherein the logic is to cause storage of a plurality of received draw requests in a circular queue in order received. Example 12 includes the apparatus of example 1, wherein the logic is to comprise a graphics pipeline. Example 13 includes the apparatus of example 1, wherein a processor is to comprise the logic. Example 14 includes the apparatus of example 1, wherein one or more of a processor, having one or more processor cores, the logic, or the queue are on a single integrated circuit die.

Example 15 includes a computer-readable medium comprising one or more instructions that when executed on a processor configure the processor to perform one or more operations to: cause storage of a draw request, corresponding to one or more primitives in an image, in an entry of a queue, wherein the entry is to be unlocked after both a front-end and a back-end of a graphics pipeline have completed one or more operations associated with the draw request. Example 16 includes the computer-readable medium of example 15, further comprising one or more instructions that when executed on the processor configure the processor to perform one or more operations to cause a front-end thread is to process the one or more primitives and bin each of the processed primitives into a corresponding tile that intersects that processed primitive. Example 17 includes the computer-readable medium of example 15, wherein, once a front-end thread, executing on the processor, has finished binning all primitives in a tile of the image, a corresponding entry of the queue is to be marked as front-end complete. Example 18 includes the computer-readable medium of example 17, further comprising one or more instructions that when executed on the processor configure the processor to perform one or more operations to cause any one of a plurality of back-end threads to be selected to perform back-end processing on the tile.

Example 19 includes a method comprising: causing storage of a draw request, corresponding to one or more primitives in an image, in an entry of a queue, wherein the entry is unlocked after both a front-end and a back-end of a graphics pipeline have completed one or more operations associated with the draw request. Example 20 includes the method of example 19, further comprising one or more threads executing on a processor performing the one or more operations corresponding to the draw request. Example 21 includes the method of example 19, further comprising causing a front-end thread to process the one or more primitives and bin each of the processed primitives into a corresponding tile that intersects that processed primitive. Example 22 includes the method of example 19, further comprising, once a front-end thread has finished binning all primitives in a tile of the image, marking a corresponding entry of the queue as front-end complete. Example 23 includes the method of example 22, further comprising causing any one of a plurality of back-end threads to be selected to perform back-end processing on the tile. Example 24 includes the method of example 19, further comprising tiles within a single draw context being processed simultaneously by multiple back-end threads. Example 25 includes the method of example 19, further comprising dividing the image into multiple tiles that are arranged in an array or matrix format. Example 26 includes the method of example 19, further comprising sizing the queue to store a sufficient number draw requests to keep a plurality of threads busy processing the draw requests during a time period. Example 27 includes the method of example 19, further comprising each entry of the queue storing a single draw request. Example 28 includes the method of example 19, wherein the queue is a circular queue. Example 29 includes the method of example 19, further comprising causing storage of a plurality of received draw requests in a circular queue in order received.

Example 30 includes a system comprising: a processor having one or more processor cores; memory to store data, corresponding to at least one frame of a scene, to be accessed by at least one of the one or more processor cores; a display device to present the at least one frame of the scene; and logic, the logic at least partially comprising hardware logic, to cause storage of a draw request, corresponding to one or more primitives in an image, in an entry of a queue, wherein the entry is to be unlocked after both a front-end and a back-end of the logic have completed one or more operations associated with the draw request. Example 31 includes the system of example 30, wherein a front-end thread is to process the one or more primitives and bin each of the processed primitives into a corresponding tile that intersects that processed primitive. Example 32 includes the system of example 30, wherein, once a front-end thread has finished binning all primitives in a tile of the image, a corresponding entry of the queue is to be marked as front-end complete, wherein any one of a plurality of back-end threads is capable to be selected to perform back-end processing on the tile.

Example 33 includes an apparatus comprising means to perform a method as set forth in any preceding example.

Example 34 includes a machine-readable storage including machine-readable instructions, when executed, to implement a method or realize an apparatus as set forth in any preceding example.

In various embodiments, the operations discussed herein, e.g., with reference to FIGS. 1-7, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1-7.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic, the logic at least partially comprising hardware logic, to cause storage of a draw request, corresponding to one or more primitives in an image, in an entry of a queue,
   wherein the entry is to be unlocked after both a front-end and a back-end of the logic have completed one or more operations associated with the draw request, wherein the logic is capable to process the one or more primitives without first sorting any portion of the one or more operations.

2. The apparatus of claim 1, wherein one or more threads are to perform the one or more operations corresponding to the draw request.

3. The apparatus of claim 1, wherein a front-end thread is to process the one or more primitives and bin each of the processed primitives into a corresponding tile that intersects that processed primitive.

4. The apparatus of claim 1, wherein, once a front-end thread has finished binning all primitives in a tile of the image, a corresponding entry of the queue is to be marked as front-end complete.

5. The apparatus of claim 4, wherein any one of a plurality of back-end threads is capable to be selected to perform back-end processing on the tile.

6. The apparatus of claim 1, wherein tiles within a single draw context are to be processed simultaneously by multiple back-end threads.

7. The apparatus of claim 1, wherein the image is to be divided into multiple tiles that are arranged in an array or matrix format.

8. The apparatus of claim 1, wherein the queue is to be sized to store a sufficient number of draw requests to keep a plurality of threads busy processing the draw requests during a time period.

9. The apparatus of claim 1, wherein each entry of the queue is to store a single draw request.

10. The apparatus of claim 1, wherein the queue is a circular queue.

11. The apparatus of claim 1, wherein the logic is to cause storage of a plurality of received draw requests in a circular queue in order received.

12. The apparatus of claim 1, wherein the logic is to comprise a graphics pipeline.

13. The apparatus of claim 1, wherein a processor is to comprise the logic.

14. The apparatus of claim 1, wherein one or more of a processor, having one or more processor cores, the logic, or the queue are on a single integrated circuit die.

15. The apparatus of claim 1, wherein the one or more primitives in the image are to comprise one or more triangles, wherein the logic is capable to process the one or more triangles out of order.

16. A non-transitory computer-readable medium comprising one or more instructions that when executed on a processor configure the processor to perform one or more operations to:
   cause storage of a draw request, corresponding to one or more primitives in an image, in an entry of a queue,
   wherein the entry is to be unlocked after both a front-end and a back-end of a pipeline have completed one or more operations associated with the draw request, wherein the one or more primitives are to be processed without first sorting any portion of the one or more operations.

17. The non-transitory computer-readable medium of claim 16, further comprising one or more instructions that when executed on the processor configure the processor to perform one or more operations to cause a front-end thread is to process the one or more primitives and bin each of the processed primitives into a corresponding tile that intersects that processed primitive.

18. The non-transitory computer-readable medium of claim 16, wherein, once a front-end thread, executing on the processor, has finished binning all primitives in a tile of the image, a corresponding entry of the queue is to be marked as front-end complete.

19. The non-transitory computer-readable medium of claim 18, further comprising one or more instructions that when executed on the processor configure the processor to perform one or more operations to cause any one of a plurality of back-end threads to be selected to perform back-end processing on the tile.

20. A method comprising:
   causing storage of a draw request, corresponding to one or more primitives in an image, in an entry of a queue,
   wherein the entry is unlocked after both a front-end and a back-end of a processor pipeline have completed one or more operations associated with the draw request, wherein at least a portion of the processor pipeline is to comprise hardware, wherein the one or more primitives are processed without first sorting any portion of the one or more operations.

21. The method of claim 20, further comprising causing a front-end thread to process the one or more primitives and bin each of the processed primitives into a corresponding tile that intersects that processed primitive.

22. The method of claim 20, further comprising, once a front-end thread has finished binning all primitives in a tile of the image, marking a corresponding entry of the queue as front-end complete.

23. The method of claim 22, further comprising causing any one of a plurality of back-end threads to be selected to perform back-end processing on the tile.

24. A system comprising:
   a processor having one or more processor cores;
   memory to store data, corresponding to at least one frame of a scene, to be accessed by at least one of the one or more processor cores;
   a display device to present the at least one frame of the scene; and
   logic, the logic at least partially comprising hardware logic, to cause storage of a draw request, corresponding to one or more primitives in an image, in an entry of a queue,
   wherein the entry is to be unlocked after both a front-end and a back-end of the logic have completed one or more operations associated with the draw request, wherein the logic is capable to process the one or more primitives without first sorting any portion of the one or more operations.

25. The system of claim 24, wherein a front-end thread is to process the one or more primitives and bin each of the processed primitives into a corresponding tile that intersects that processed primitive.

26. The system of claim 24, wherein, once a front-end thread has finished binning all primitives in a tile of the image, a corresponding entry of the queue is to be marked as front-end complete, wherein any one of a plurality of back-end threads is capable to be selected to perform back-end processing on the tile.

* * * * *